Oct. 15, 1935. F. SPROXTON 2,017,705
MANUFACTURE OF MATERIALS FOR PRODUCING OR DETECTING POLARIZED LIGHT
Filed April 3, 1934
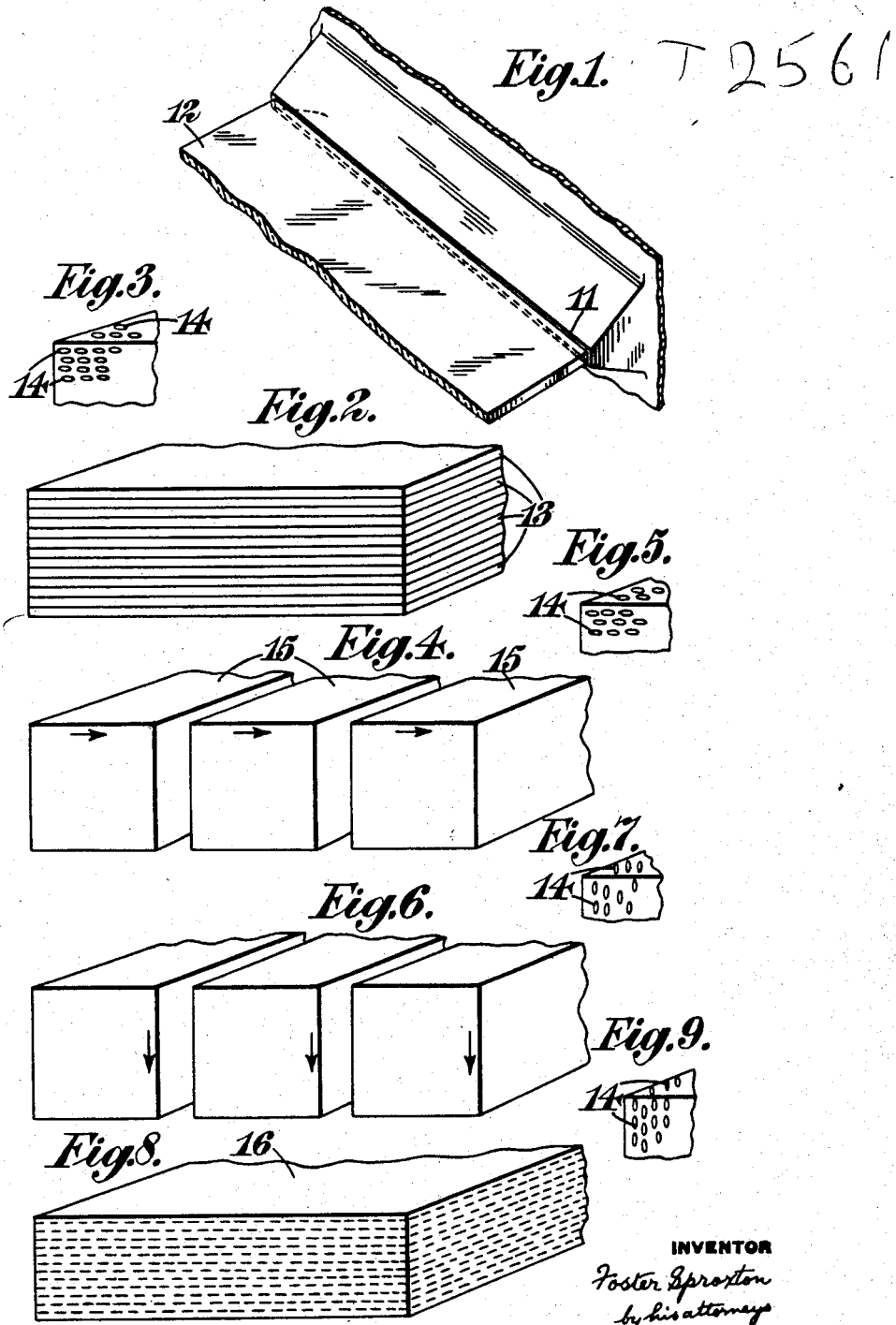

Patented Oct. 15, 1935

2,017,705

UNITED STATES PATENT OFFICE 2,017,705

MANUFACTURE OF MATERIALS FOR PRODUCING OR DETECTING POLARIZED LIGHT

Foster Sproxton, Manningtree, England, assignor to The British Xylonite Company Limited, Hale End, London, England Application April 3, 1934, Serial No. 718,802
In Great Britain May 4, 1933

18 Claims. (Cl. 18—51)

This invention is for improvements in or relating to the manufacture of materials for producing or detecting polarized light. Up to the present, polarized light has usually been produced either by (a) passing a beam of light through certain doubly-refracting crystals, such as tourmaline or calcite, which may or may not require a special device to divert from the eye of the observer one of the polarized beams produced; (b) by causing light to be reflected from a surface, such as black glass, or from a series of parallel surfaces, such as the well-known pile of glass plates; (c) by causing light to be refracted through a series of parallel surfaces, such as a pile of glass plates.

It is well known that any device for producing polarized light may also be used to detect polarized light. The detection depends on the fact that when a beam of polarized light other than circularly polarized light is passed through a second polarizing device, the intensity of the transmitted beam may be altered by rotating the second device around the axis of the beam of light.

Although sources of polarized light of large cross-section are obtained without inconvenience, convenient polarizing devices for detecting polarized light, such as the well known Nicol prism, will accommodate only a narrow beam on account of the limited size of the crystals available and are expensive.

It is an object of the present invention to provide a light-polarizing material which can be manufactured relatively cheaply in such a size that beams of light of comparatively large cross-section and more or less completely polarized can be produced or detected. It has been found that by arranging lamellar particles, preferably transparent lamellar particles having good reflecting surfaces, in a transparent or translucent solid of different refractive index, so that the surfaces of the lamellæ lie in substantially parallel planes, light passing through the material in such a way that it is reflected or refracted by the particles is more or less polarized. The polarization is particularly marked when the surfaces of the lamellæ lie in planes inclined to that surface of the transparent or translucent material at which the light enters at an angle greater than the angle made with the normal by a refracted ray entering that surface at grazing incidence.

The present invention accordingly provides a process for the manufacture of a light-polarizing material which comprises distributing in a transparent or translucent material transparent reflecting lamellar particles having a different refractive index from that of the transparent or translucent material, the lamellæ being regularly arranged so that their surfaces lie substantially in parallel planes inclined to the surface of the material at an angle greater than the angle made with the normal by a refracted ray entering the transparent material at grazing incidence. Thus, if a ray entering a transparent or translucent material at grazing incidence is refracted so that the angle it forms with the normal is $\alpha$ lamellar particles are in accordance with the present invention arranged in parallel planes inclined to that surface of the material at which the light enters at an angle greater than $\alpha$. Since the degree of polarization depends on the angle made by the beam of incident light with the planes of the particles, the alteration in the angle made by the planes of the lamellæ with the surface of the sheet will, in general, alter the direction of maximum polarization of the light. The transparency of the sheet to light at normal incidence will usually be best if the lamellæ are arranged with their reflecting planes at right angles to the surface of the sheet, but the invention is not limited to lamellæ so arranged. The arrangement of the lamellæ in parallel planes may be readily effected by causing material in which they are suspended to flow, e. g. through an orifice or slot.

The lamellæ may conveniently consist of a transparent reflecting substance in the form of minute plates and the transparent or translucent substance in which it is suspended may consist of a substance which can be brought into the form of a plastic or liquid capable of extrusion, or of being caused to flow. The plastic may consist of a plasticized ester or ether of cellulose, a natural or artificial resin or a plastic (having suitable optical and mechanical characteristics) prepared by the polymerization or condensation of one or more organic compounds. The transparent or translucent substance may, if desired, consist of a supercooled liquid, such as glass.

The polarizing material may conveniently be prepared in the form of plates or sheets, by extruding through a slot, the transparent or translucent plastic material having suspended in it lamellar particles, the process of extrusion tending to arrange the lamellæ in planes parallel with the plane of extrusion. If plates so obtained are sliced parallel to the plane of extrusion the lamellæ will have their reflecting surfaces parallel with the surface of the sheet, and light passing through such a sheet will have the minimum chance of repeated reflection by the particles so that there will be little or no polarizing effect. Surfaces obtained by cutting a plate by a plane inclined to the plane of extrusion will have the reflecting surfaces of the particles inclined to the surface, and sheets so cut are more effective as polarizing materials. The width of such sheets, however, will be limited by the thickness of the extruded plate, but a pile of the extruded plates may be pressed, moulded or welded into a block and the block may be cut in parallel planes to yield slabs in which the surfaces of the lamellæ are inclined to the new surfaces produced. From these slabs a new block can be built up and welded together from which sheets can be sliced in the usual way, and these sheets will contain the particles arranged in planes inclined to the surface. If, for example, it is desired to produce sheets containing lamellæ arranged in parallel planes at right angles to the surface, a sheet or plate of material, prepared as indicated above, is cut into a series of similar rectangular prisms. Each of these prisms is turned about one of its long edges through an angle of 90° and the series is assembled and, when the nature of the material permits, pressed, moulded or welded into a composite plate. From this plate a sheet may be cut in a plane transverse to those in which the surfaces of the lamellar particles lie.

Alternatively, the lamellar particles may be arranged by allowing a liquid in which the particles are suspended to flow over a surface of the plastic material, draining off excess liquid, uniting a number of sheets of the plastic and cutting and reassembling as described above.

It is known that the reflection of light from certain surfaces effects partial polarization and use of polarizing sheets in the path of such reflected and polarized light, e. g. in front of the eye of an observer (at certain dispositions of the sheet) tends to cut off the polarized part of the light.

Polarizing materials manufactured in accordance with the present invention may be employed therefore to protect the eye from reflected glare, or in optical instruments and in particular in those instruments in which a wide field of view is desirable, for example, in strain-viewers for providing optical indications of the presence of stresses in transparent or translucent articles. When used for this purpose a pair of polarizing sheets placed so that the minimum amount of light passes through them, are arranged one on either side of the material the stresses of which it is desired to test. The stressed portions of the material are indicated by bright or coloured areas.

It is a further object of the present invention to provide a process for the manufacture of composite ornamental articles which comprises a pair of polarizing transparent or translucent layers, having between them a suitable thickness of transparent or translucent material which is doubly refracting. When such an ornamental article is viewed by transmitted light, it exhibits the characteristic coloured effects associated with pearls and similar translucent stones. If desired, the article may be backed with a reflecting surface and viewed by reflected light. Materials showing colour in polarized light may also be added to the original plastic in which the lamellæ are arranged by extrusion.

There are many situations in which ordinary illumination contains a considerable proportion of polarized light, e. g. a window where some of the light received has been reflected from non-metallic surfaces such as glass. In such positions doubly refracting material will show colour at certain angles if a polarizing layer is placed between it and the eye of the observer. The fact that the source of light is partly polarized may dispense with the need for a second sheet of polarizing material on the side further from the observer.

The present invention further includes the manufacture of laminated or safety glass, e. g. for vehicle wind-screens, in which the whole reinforcing layer or certain portions thereof is made of polarizing material. The arrangement of the lamellæ is preferably such that the light reflected for example from a road surface (which light is polarized to some extent) is largely cut off, and it will be understood that in these circumstances the safety glass possesses anti-dazzle properties. Alternatively polarizing material manufactured according to the present invention may be employed for visors for goggles or as polarizers of the light from any source of illumination.

Such polarizing material may be employed in an arrangement in which the headlamp glasses and the screens of vehicles are made of transparent material capable of polarizing light in a plane normal to the glass and inclined at an angle of 45° to the horizontal. In this way, similarly polarized light from the headlamps of an approaching vehicle is cut off more or less by the screen while reflected light from the driver's own lamps will be admitted by the screen. A sector of a driving screen or a visor or a goggle may be made rotatable in its own plane so that it may be adjusted to the position in which it cuts off the maximum amount of the polarized light falling upon it.

It is also within the scope of the present invention to employ transparent or translucent polarizing materials, manufactured as described above, in the construction of advertising signs and display devices, for example devices in which alternate illumination and darkening or the appearance, disappearance or variation of colour is caused to take place.

Following are descriptions by way of example and with reference to the accompanying diagrammatic drawing of methods of carrying the present invention into effect in the manufacture of a transparent or translucent material capable of polarizing light.

In the drawing:—

Figure 1 shows an extrusion slot 11 through which a sheet 12 of celluloid plastic having lamellar particles suspended in it is being extruded.

Figure 2 shows in perspective a number of sheets 13 similar to 12 superposed to form a composite block.

Figure 3 is an enlarged view of a portion of one of the sheets 13 in which the lamellar particles 14 are seen to be arranged parallel to the large faces of the sheet.

Figure 4 is a perspective view of portions of three blocks in the form of rectangular prisms cut from a block formed by subjecting the composite mass shown in Figure 2 to heat and pressure.

Figure 5 is a view on an enlarged scale of a portion of one of the blocks shown in Figure 4 showing the arrangement of the lamellar particles 14 with respect to the horizontal and vertical faces of the block.

Figure 6 is a perspective view of the portions of the three blocks shown in Figure 4 after each block has been turned through 90° about its longitudinal axis as indicated by the arrows marked on the front faces of the prisms.

Figure 7 is an enlarged view of a portion of one of the blocks shown in Figure 6 showing the arrangement of the lamellar particles 14 with respect to the faces of the block.

Figure 8 is a perspective view of a portion of the composite block formed by subjecting a series of prisms arranged as shown in Figure 6 to heat and pressure, the dotted lines showing the planes through which sheets are subsequently sliced from the block.

Figure 9 is a view on a larger scale indicating the arrangement of the lamellar particles 14 with respect to the faces of the block shown in Figure 8.

*Example I*

Celluloid dough is prepared by the usual method and with it is mixed a small proportion, for example 1 to 3%, of the material commercially known as "pearl essence" or "Essence d'Orient". The dough is extruded through a slot (such as 11, Figure 1) of any convenient length and depth, for example, the slot may be 18" long and 0.3 to 0.5" in width. In the slabs of celluloid dough extruded in this way the lamellæ contained in the pearl essence (which consist of very small transparent plate-like particles) are arranged with their largest surfaces substantially parallel to the direction of flow and to the long axis of the slot (as indicated at 14 in Figure 3). A number of such slabs are stacked one on the other (Figure 2) and united by heat and pressure to form a composite block. In order to make the final polarizing properties more uniform this block may be sliced thinly on the usual form of celluloid slicing machine, alternate sheets may be reversed, and the pile compressed again to form a solid block. This step is, however not essential to the invention.

The block is then cut vertically as shown in Figure 4 to form a series of rectangular prisms 15. If desired, before this is done the block may be sliced into sheets of any desired thickness and the rectangular cuts may be made on the pile of sheets instead of on the block. The rectangular prisms 15 (Figure 4) are then turned on their long axis through an angle of 90°, making the surfaces which were previously vertical, horizontal, and vice versa (see Figure 6).

This process brings the planes of the large surfaces of the particles substantially at right angles to the surface of the new block 16 formed by compressing the series of turned blocks (see Figures 5 and 7). The re-formed block may then be sliced into sheets of any desired thickness, as indicated by the dotted lines in Figure 8, and these sheets in which the lamellar particles are arranged as shown in Figure 9 show marked polarization of transmitted light. Such sheets may be made up into safety glass in the usual way if desired.

*Example II*

Thin sheets of celluloid are dipped into a liquid having lamellar particles, e. g. in the form of pearl essence suspended in it. The sheets are withdrawn from the liquid and as the liquid drains away, the lamellæ are left as a coating on the surfaces of the sheets with their reflecting faces parallel to it. A number of such coated sheets are superposed and pressed into a block which is then cut into prisms, reassembled and sliced as described in Example I.

In a modification of this method calendered sheets of celluloid dough are dipped into a suspension of lamellar particles at repeated intervals during the calendering process. The layers of lamellar particles can thus be spaced throughout the sheets more closely than is possible by dipping sheets without subsequent rolling. A number of the calendered sheets are superposed, pressed into a block, cut into prisms, reassembled, pressed and sliced as described above.

*Example III*

In order to make a transparent or translucent material showing a play of colour in the transmitted light, two sheets of polarizing material made as described above are taken and a sheet of doubly refracting transparent or translucent material, for example, a doubly refracting transparent regenerated cellulose film is placed between them, choosing the angle which gives the most effective play of colour.

The three sheets may be stuck or held together in any other way. The product shows a play of colour when viewed in transmitted light, particularly when the light is well diffused.

For advertising purposes and the like the central doubly refracting sheet may be kept separate from the polarizing sheets on both sides of it, and may be rotated or moved in any other way so as to give varying colours in different positions, or one or both of the polarizing sheets may be similarly rotated or moved. The colour effects may also be varied by altering the effective thickness of the doubly refracting material for example by adding layers of the doubly refracting material.

It will be understood that the thickness of the composite sheet may be increased by adding sheets of transparent material either between the polarizing sheets and the doubly refracting sheet or outside the polarizing sheets, on one side or both. Further, it will be understood that by varying the sizes of the rectangular prisms which are turned through a right angle in making the original block of polarizing material, or cutting the prisms of different shapes or at different angles, or interspersing with them non-polarizing materials of any desired kind, a great variety of decorative materials may be made. Such materials may be used for lamp shades or for any ornamental purposes where articles are viewed by transmitted light. They may also be used for causing variations of colour in any transmitted beam of light, e. g., in the beam of a projecting lantern or similar device.

I claim:

1. A process for the manufacture of a light-polarizing material which comprises arranging in a transparent material which can be brought into the plastic form transparent reflecting lamellar particles having a refractive index different from that of the transparent material, the lamellæ being regularly arranged so that their surfaces lie substantially in parallel planes inclined to the surface of the material at an angle greater than the angle made with the normal by a refracted ray entering the transparent material at grazing incidence.

2. A process for the manufacture of a light-polarizing material which comprises arranging in a translucent material which can be brought into the plastic form transparent reflecting lamellar particles having a refractive index different from that of the translucent material, the lamellæ being regularly arranged so that their surfaces lie substantially in parallel planes inclined to the surface of the material at an angle greater than the angle made with the normal by a refracted ray entering the translucent material at grazing incidence.

3. A process for the manufacture of a light-polarizing material which comprises assembling into a block a plurality of transparent sheets in each of which lamellar particles having a different refractive index from that of the transparent material are arranged in planes parallel with the surface of the sheet, cutting the block transversely to the layers of transparent material to form a series of rectangular prisms, turning each prism about its longitudinal axis, and re-assembling the prisms by the application of pressure so that the lamellar particles take up positions in parallel planes inclined to the surface of the re-formed block at an angle greater than the angle made with the normal by a refracted ray entering the block at grazing incidence.

4. A process for the manufacture of a light-polarizing material which comprises assembling into a block a plurality of translucent sheets in each of which lamellar particles having a different refractive index from that of the translucent material are arranged in planes parallel with the surface of the sheet, cutting the block transversely to the layers of translucent material to form a series of rectangular prisms, turning each prism about its longitudinal axis, and re-assembling the prisms by the application of pressure so that the lamellar particles take up positions in parallel planes inclined to the surface of the reformed block at an angle greater than the angle made with the normal by a refracted ray entering the block at grazing incidence.

5. A process for the manufacture of a light-polarizing material which comprises assembling into a block a plurality of transparent sheets in each of which lamellar particles having a different refractive index from that of the transparent material are arranged in planes parallel with the surface of the sheet, cutting the block transversely to the layers of transparent material to form a series of rectangular prisms, turning each prism about its longitudinal axis, and re-assembling the prisms by the application of heat and pressure so that the lamellar particles take up positions in parallel planes inclined to the surface of the re-formed block at an angle greater than the angle made with the normal by a refracted ray entering the block at grazing incidence.

6. A process for the manufacture of a light-polarizing material which comprises assembling into a block a plurality of translucent sheets in each of which lamellar particles having a different refractive index from that of the translucent material are arranged in planes parallel with the surface of the sheet, cutting the block transversely to the layers of translucent material to form a series of rectangular prisms, turning each prism about its longitudinal axis, and re-assembling the prisms by the application of heat and pressure so that the lamellar particles take up positions in parallel planes inclined to the surface of the re-formed block at an angle greater than the angle made with the normal by a refracted ray entering the block at grazing incidence.

7. A process for the manufacture of a light-polarizing material which comprises dipping a sheet of a transparent material which can be brought into the plastic form into a suspension of transparent lamellar particles having a refractive index different from that of the transparent material, removing the sheet from the liquid and allowing excess of liquid to drain therefrom, assembling into a block a plurality of said dipped sheets, cutting the block transversely to the layers of transparent material into rectangular prisms, turning each prism about its longitudinal axis and re-uniting the prisms by the application of heat and pressure so that the lamellar particles take up positions in parallel planes inclined to the surface of the re-formed block at an angle greater than the angle made with the normal by a refracted ray entering the block at grazing incidence.

8. A process for the manufacture of a light-polarizing material which comprises dipping a sheet of a translucent material which can be brought into the plastic form into a suspension of transparent lamellar particles having a refractive index different from that of the translucent material, removing the sheet from the liquid and allowing excess of liquid to drain therefrom, assembling into a block a plurality of said dipped sheets, cutting the block transversely to the layers of translucent material into rectangular prisms, turning each prism about its longitudinal axis and re-uniting the prisms by the application of heat and pressure so that the lamellar particles take up positions in parallel planes inclined to the surface of the re-formed block at an angle greater than the angle made with the normal by a refracted ray entering the block at grazing incidence.

9. A process for the manufacture of a light-polarizing material which comprises arranging in sheets of a transparent material which can be brought into the plastic form transparent reflecting lamellar particles having a refractive index different from that of the transparent material, the lamellæ being regularly arranged so that their surfaces line in planes substantially parallel to the surfaces of said sheets, superimposing a series of such sheets, uniting the said sheets into a block, cutting the said block into a series of similar prisms by planes inclined to the surface of the block at an angle greater than the angle made with the normal by a refracted ray entering the transparent material at grazing incidence and re-uniting the prisms at edge faces adjacent to those which previously joined them.

10. A process for the manufacture of a light-polarizing material which comprises distributing in a transparent cellulose ester plastic a proportion of transparent reflecting lamellar particles having a refractive index different from that of the cellulose ester plastic, extruding the mixture while in the plastic form through a slot so as to arrange the lamellæ with their surfaces in substantially parallel planes to the surfaces of the extruded sheets, assembling into a block a plurality of said sheets, cutting the block transversely to the layers of cellulose ester plastic into rectangular prisms, turning each prism about its longitudinal axis and re-uniting the prisms into a block so that the lamellar particles take up positions in parallel planes inclined to the surfaces of the block at an angle greater than the angle made with the normal by a refracted ray entering the block at grazing incidence.

11. A process for the manufacture of a light-polarizing material which comprises distributing in a transparent cellulose ether plastic a proportion of transparent reflecting lamellar particles having a refractive index different from that of the cellulose ether plastic, extruding the mixture while in the plastic form through a slot so as to arrange the lamellæ with their surfaces in substantially parallel planes to the surfaces of the extruded sheets, assembling into a block a plurality of said sheets, cutting the block transversely to the layers of cellulose ether plastic into rectangular prisms, turning each prism about its longitudinal axis and re-uniting the prisms into a block so that the lamellar particles take up positions in parallel planes inclined to the surfaces of the block at an angle greater than the angle made with the normal by a refracted ray entering the block at grazing incidence.

12. A process for the manufacture of a light-polarizing material which comprises mixing with a transparent or translucent resin a proportion of transparent reflecting lamellar particles having a refractive index different from that of the resin, extruding the mixture while in a plastic form through a slot so as to arrange the lamellar particles with their surfaces substantially parallel to the surfaces of the extruded sheet, assembling and uniting a series of such sheets to form a block, cutting said block transversely to the layers of resinous material so as to form a series of similar prisms, turning each prism about its longitudinal axis and re-uniting the prisms into a block so that the lamellar particles take up positions in parallel planes inclined to the surface of the block at an angle greater than the angle made with the normal by a refracted ray entering the block at grazing incidence.

13. A process for the manufacture of a light-polarizing material which comprises mixing with a transparent or translucent polymerization product of one or more organic compounds a proportion of transparent reflecting lamellar particles having a refractive index different from that of the polymerization product, extruding the mixture while in a plastic form through a slot so as to arrange the lamellar particles with their surfaces substantially parallel to the surfaces of the extruded sheet, assembling and uniting a series of such sheets to form a block, cutting said block transversely to the layers of polymerization product so as to form a series of similar prisms, turning each prism about its longitudinal axis and re-uniting the prisms into a block so that the lamellar particles take up positions in parallel planes inclined to the surface of the block at an angle greater than the angle made with the normal by a refracted ray entering the block at grazing incidence.

14. A process for the manufacture of a light-polarizing material which comprises mixing with a transparent or translucent condensation product of one or more organic compounds a proportion of transparent reflecting lamellar particles having a refractive index different from that of the condensation product, extruding the mixture while in a plastic form through a slot so as to arrange the lamellar particles with their surfaces substantially parallel to the surfaces of the extruded sheet, assembling and uniting a series of such sheets to form a block, cutting said block transversely to the layers of a condensation product so as to form a series of similar prisms, turning each prism about its longitudinal axis and re-uniting the prisms into a block so that the lamellar particles take up positions in parallel planes inclined to the surface of the block at an angle greater than the angle made with the normal by a refracted ray entering the block at grazing incidence.

15. A process for the manufacture of a light-polarizing material which comprises arranging in a transparent supercooled liquid such as glass transparent reflecting lamellar particles having a refractive index different from that of the glass, bringing the mixture to the plastic state and extruding it through a slot so that the lamellar particles are arranged with their surfaces substantially parallel to the surfaces of the sheet, assembling a plurality of extruded sheets into a composite block, cutting the block transversely to the layers of glass into a series of similar prisms, turning each prism about its longitudinal axis and re-uniting the prisms into a block so that the lamellar particles take up positions in parallel planes inclined to the surface of the block at an angle greater than the angle made with the normal by a refracted ray entering the block at grazing incidence.

16. As an article of manufacture a light-polarizing material which comprises a transparent or translucent material capable of being brought into the plastic state and having arranged in it transparent reflecting lamellar particles having a different refractive index from that of the transparent or translucent plastic material, the lamellæ being arranged so that their surfaces lie substantially in parallel planes inclined to the surfaces of the material at an angle greater than the angle made with the normal by a refracted ray entering the transparent or translucent material at grazing incidence.

17. As an article of manufacture a composite ornamental article comprising a layer of doubly refracting material having on each side thereof a layer of polarizing material comprising a transparent or translucent material having suspended therein transparent reflecting lamellar particles having a refractive index different from that of the transparent or translucent material, the lamellæ being regularly arranged so that their surfaces lie substantially in parallel planes inclined to the surfaces of the transparent or translucent material at an angle greater than the angle made with the normal by a refracted ray entering the transparent or translucent material at grazing incidence.

18. As an article of manufacture laminated glass whereof the re-inforcing layer or a portion thereof comprises a light-polarizing sheet consisting of a transparent plastic material having transparent reflecting lamellar particles suspended therein in parallel planes inclined to the surface of the sheet at an angle greater than the angle made with the normal by a refracted ray entering the transparent material at grazing incidence.

FOSTER SPROXTON.